United States Patent [19]

Trap

[11] 3,776,745

[45] Dec. 4, 1973

[54] LITHIUM-BOROVANADATE GLASS FOR USE IN A SECONDARY ELECTRODE

[75] Inventor: Hendrikus Johan Lodewijk Trap, Emmasingel, Netherlands

[73] Assignee: U. S. Philips Corporation, New York, N.Y.

[22] Filed: Nov. 11, 1971

[21] Appl. No.: 197,940

Related U.S. Application Data

[63] Continuation of Ser. No. 862,446, Sept. 30, 1969, abandoned.

[30] Foreign Application Priority Data

Oct. 2, 1968 Netherlands.................... 6814050

[52] U.S. Cl.................... 106/54, 106/47 R, 252/521
[51] Int. Cl......... C03c 3/14, H01b 1/06, C03c 3/30
[58] Field of Search................. 106/47 R, 47 Q, 54; 252/518, 521

[56] References Cited
UNITED STATES PATENTS 3,061,752  10/1962  Banks............................... 106/47 R
3,258,434  6/1966  MacKenzie et al................. 252/519
3,278,317  10/1966  Blair et al. ......................... 106/47 R
3,520,831  7/1970  Trap................................... 106/47 R

FOREIGN PATENTS OR APPLICATIONS 8,704  11/1907  Great Britain..................... 106/47 R
744,947  2/1956  Great Britain..................... 106/47 R Primary Examiner—A. B. Curtis
Assistant Examiner—Mark Bell
Attorney—Frank R. Trifari

[57] ABSTRACT

Glass particularly suitable for use in a secondary emission electrode and comprising $Li_2O$, $V_2O_5$, $B_2O_3$ and possibly CaO and $SiO_2$, the composition in % by weight satisfying the following conditions:

$10 < V_2O_5 < 56$
$25 < B_2O_3 < 75$
$32 < (B_2O_3+SiO_2) < 75$
$9 < (Li_2O+CaO) < 28$
$(Li_2O+CaO) < 44/35 \ (B_2O_3+SiO_2) - 26.4$

2 Claims, No Drawings

LITHIUM-BOROVANADATE GLASS FOR USE IN A SECONDARY ELECTRODE

This is a continuation, of application Ser. No. 862,446, filed Sept. 30, 1969, now abandoned.

The invention relates to a range of glass compositions which are eminently suitable for use in a secondary emission electrode. This secondary emission electrode comprises a body having two parallel boundary surfaces and being provided with a plurality of channels which are either or not at right angles to the said boundary surfaces and are open at either end. Both boundary surfaces are coated with an electrically counducting layer and a voltage difference is applied between these layers. Electrons move through the said channels from one side of the electrode to the other side under influence of the electric field thus obtained.

The secondary emission multiplication in the channels is effected in the following manner. There are comparatively few electrons which travel undisturbed from one side of the channel to the other without striking the wall. In addition to a forwardly directed velocity component, the other electrons have also a laterally directed velocity component which causes them to strike the wall one or more times when travelling through the channel. In the relevant electrode the walls of the said channels consist of a substance which has the property of being secondarily emissive so that two or more electrons are released at every impact. In this manner the density of the electrons which leave the electrode is considerably increased relative to the density of the electrons impinging upon the electrode.

To maintain a uniform voltage distribution along the electron paths it is necessary that sufficient electrons are supplied by the voltage source to replace the secondary electrons which are removed. The specific resistance of the material must, however, not be so low that a noticeable increase in temperature occurs.

Up until now two kinds of glass have found acceptance which have a secondary emission factor of more than one at the conventional electron speed. These glasses were used as inner coatings of tubes of a soft substrate glass. In order to manufacture a secondary emission electrode, which has, a diameter of, for example, 3–10 cm and a thickness of 1–2½ mm, and a plurality of apertures of approximately $10^5$ per sq.cm at a diameter of 40 $\mu$, the starting point is a glass tube having a diameter of, for example, 7 mm, whose inner side is provided with a layer by means of a suspension of the powdered glass, and whose outer side has a layer of a low melting enamel. These glass tubes are drawn out in stages while heating, for example, first to 1 mm and subsequently to 40 $\mu$. The hollow fibres obtained are bundled in a jig and are collectively heated whereafter the fibres are connected together by flowing of the low melting enamel, the interstice being filled up.

One of the kinds of glass known for this purpose is a lead-bismuth glass known from British Pat. Specification 971,733 which after completion of the electrode is subjected to a reducing treatment, for example, a heat treatment in a hydrogen atmosphere. A drawback of this method is that the ultimate conductivity is difficult to reproduce due to the sensitivity of the product relative to the different pre-treatments. The other kind of glass for this purpose known from the French Pat. Specification 1.509.628 is a phosphovanadate glass. The drawback of this kind of glass and the kind of glass described above is the cumbrous and time-consuming technique of providing a thin layer.

The present invention provides a class of glasses which have the right level of specific resistance, an emission factor of more than one and a softening point, which is the temperature at which the viscosity is $10^{7.6}$ poises, is between approximately 400° and 580°C. As a result, an independent processing without substrate glass is possible. As regards their specific resistance, it is of great importance that no noticeable variation of the specific resistance occurs after drawing out the invented glasses to 15 $\mu$.

The glasses according to the invention are characterized in that they comprise $Li_2O$, $B_2O_3$, $V_2O_5$ and if desired $CaO$ and $SiO_2$, the contents of these components in % by weight satisfying the following conditions:

$10 < V_2O_5 < 56$
$25 < B_2O_3 < 75$
$32 < (B_2O_3 + SiO_2) < 75$
$9 < (Li_2O + CaO) < 28$
$(Li_2O + CaO) < 44/35 (B_2O_3 + SiO_2) - 26.4$

The invention will now be described with reference to Table I which gives a plurality of glasses within the range of composition of the present invention and which shows a survey of the logarithm of the specific resistance at room temperature and at 250°C (log $\rho$ ), the log rithm of the surface resistance (log $H$; $\rho$ and $H$ indicated in ohm cm and ohm per square respectively) and the softening point in °C.

These glasses were obtained in a manner conventional in glass technology by melting a mixture of the relevant oxides and/or carbonates in an oxidizing atmosphere.

Tubes having a diameter of 7–7.5 mm were drawn from these glasses and the tubes were coated with a thin layer of enamel having the composition in % by weight:

| | | | |
|---|---|---|---|
| PbO | 77.1 | $SiO_2$ | 1.5 |
| ZnO | 2.0 | $Al_2O_3$ | 5.5 |
| $B_2O_3$ | 13.4 | CoO | 0.5 |

These tubes were subsequently drawn out to a diameter of 1 mm, the tubes obtained were bundled and the bundle was again drawn out to 1 mm. The hollow monofibre then obtained a diameter of 15 $\mu$. Subsequently, the hollow multifibres obtained were cut to pieces of 10 cm, bundled in a jig after the ends of the multifibres had been sealed off and the assembly was heated until the low melting enamel had filled up the interstices between the fibres.

After cooling and removing the sealed ends, the hollow fibres were filled with wax and the assembly was subsequently sawn into discs having a thickness of 2 mm. Subsequently, the wax was removed from the tubes with the aid of ethyl alcohol. Finally the discs were provided with metal coatings on either side by means of vapour deposition and they could then serve as secondary emission electrodes.

TABLE I

| Number | Composition (percent by weight) | | | | | log ρ (ρ in H cm.) | | Log H (H in Ω) per square | Softening point (° C.) |
| --- | --- | --- | --- | --- | --- | --- | --- | --- | --- |
| | Li₂O | B₂O₃ | CaO | SiO₂ | V₂O₅ | At room temp. | At 250° C. | | |
| 1 | 10.9 | 51.1 | | | 38.0 | 10.57 | 5.1 | 11.34 | 423 |
| 2 | 10.0 | 47.0 | | | 43.0 | 10.81 | 5.20 | 11.73 | |
| 3 | 14.4 | 48.1 | | | 37.5 | 9.08 | 4.34 | 10.03 | |
| 4 | 13.4 | 40.2 | | | 46.4 | 9.05 | 4.30 | 9.87 | |
| 5 | 9.3 | 43.2 | | | 47.5 | 10.46 | 5.20 | 10.38 | |
| 6 | 12.5 | 58.1 | 3.3 | 3.6 | 22.5 | 10.98 | 5.41 | 11.75 | 452 |
| 7 | 14.0 | 64.9 | | | 21.1 | 10.73 | 5.15 | 11.38 | 489 |
| 8 | 15.1 | 70.5 | 1.0 | 1.2 | 12.2 | 10.78 | 5.6 | 11.63 | 522 |
| 9 | 7.1 | 33.1 | 13.2 | 14.2 | 32.4 | 12.76 | 6.34 | 13.50 | 501 |
| 10 | 11.0 | 51.4 | 2.0 | 2.1 | 33.5 | 10.56 | 5.2 | 11.29 | 459 |
| 11 | 9.4 | 43.6 | 4.4 | 4.7 | 37.9 | 11.10 | 5.5 | 11.92 | 439 |
| 12 | 7.8 | 36.2 | 8.7 | 9.4 | 37.9 | 11.99 | 5.96 | 12.71 | |
| 13 | 6.2 | 28.9 | 13.1 | 14.0 | 37.8 | 12.86 | 6.52 | 13.81 | 493 |
| 14 | 7.6 | 35.3 | 3.2 | 3.5 | 50.4 | 11.47 | 5.52 | | |
| 15 | 6.9 | 32.1 | 5.2 | 5.5 | 50.3 | 11.64 | 5.60 | | |
| 16 | 6.2 | 28.8 | 7.1 | 7.6 | 50.3 | 11.89 | 5.83 | | |
| 17 | 6.6 | 30.6 | 8.9 | 9.5 | 44.4 | 12.13 | 6.03 | 13.20 | 435 |
| 18 | 5.6 | 26.4 | 10.0 | 10.6 | 47.4 | 12.65 | 6.27 | | |
| 19 | 6.5 | 30.4 | 3.6 | 4.0 | 55.5 | 11.16 | 5.59 | | |
| 20 | 8.2 | 38.7 | 1.3 | 1.4 | 50.4 | 11.31 | 5.39 | | |
| 21 | 9.0 | 42.1 | 1.3 | 1.5 | 46.1 | 11.03 | 5.28 | | |
| 22 | 8.0 | 37.0 | 5.1 | 5.5 | 44.4 | | 5.46 | 11.23 | 423 |
| 23 | 10.4 | 36.6 | | | 53.0 | 9.53 | 4.35 | 10.15 | |
| 24 | 19.6 | 40.7 | | | 39.7 | 8.58 | 3.96 | 9.36 | |
| 25 | 21.4 | 49.8 | | | 28.8 | 8.90 | | | |
| 26 | 27.0 | 56.6 | | | 16.4 | 9.18 | | 9.61 | |
| 27 | 15.7 | 36.7 | | | 47.6 | 8.58 | | 9.35 | |
| 28 | 18.8 | 43.7 | 4.4 | 4.7 | 28.4 | 8.99 | | | |
| 29 | 16.0 | 37.1 | 4.0 | 4.3 | 38.6 | 8.88 | | 9.77 | 430 |
| 30 | 16.2 | 37.8 | 8.6 | 9.3 | 28.1 | 9.87 | | 10.66 | 459 |
| 31 | 16.9 | 39.6 | 6.8 | 7.3 | 29.4 | 9.37 | | 10.18 | 430 |
| 32 | 13.7 | 32.0 | 12.8 | 13.7 | 27.8 | 10.73 | | | 477 |
| 33 | 12.5 | 29.2 | 14.8 | 15.9 | 27.6 | 10.92 | | | 482 |

TABLE II

| Number | Composition (percent by weight) | | | | | Notes: |
| --- | --- | --- | --- | --- | --- | --- |
| | Li₂O | B₂O₃ | CaO | SiO₂ | V₂O₅ | |
| 34 | 6.7 | 3.10 | | | 62.3 | No glass. |
| 35 | 6.0 | 69.8 | | | 24.2 | Surface conductivity varies. |
| 36 | 8.4 | 78.2 | | | 13.4 | Log ρ at room temp. 14. |
| 37 | | | 32.9 | 35.2 | 31.9 | No glass. |
| 38 | 1.7 | 8.2 | 32.8 | 35.2 | 22.1 | Log H at room temp, 14.6. |
| 39 | 12.6 | 29.3 | 1.7 | 1.8 | 54.6 | No glass. |
| 40 | 22.5 | 36.7 | | | 40.8 | Do. |

To motivate the boundary of the range of composition, Table II shows a few compositions outside this range and states the reason why these compositions are unsuitable for use in a secondary emission electrode.

What is claimed is:

1. Glass consisting essentially of the following in % by weight:

12.2 ≤ V₂O₅ ≤ 55.5
26.4 ≤ B₂O₃ ≤ 70.5
5.6 ≤ Li₂O ≤ 18.8
1.0 ≤ CaO ≤ 14.8
1.2 ≤ SiO₂ ≤ 15.9 wherein said glass has a secondary emission factor greater than one and is particularly suited for use as a secondary emission electrode.

2. Glass consisting essentially of the following in % by weight:

16.4 ≤ V₂O₃ ≤ 53
36.6 ≤ B₂O₃ ≤ 64.9
9.3 ≤ Li₂O ≤ 27 wherein said glass has a secondary emission factor greater than one and is particularly suited for use as a secondary emission electrode.

* * * * *

PO-1050
(5/69)

UNITED STATES PATENT OFFICE
CERTIFICATE OF CORRECTION

Patent No.     3,776,745        Dated    December 4, 1973

Inventor(s)   HENDRIKUS JOHAN LODEWIJK TRAP

It is certified that error appears in the above-identified patent and that said Letters Patent are hereby corrected as shown below:

Column 3, Table II, #34 under $B_2O_3$, "3.10" should read --31.0--

Signed and sealed this 4th day of June 1974.

(SEAL)
Attest:

EDWARD M. FLETCHER, JR.
Attesting Officer

C. MARSHALL DANN
Commissioner of Patents